(12) United States Patent
Dittmann et al.

(10) Patent No.: US 9,409,321 B2
(45) Date of Patent: Aug. 9, 2016

(54) MOULDED BODY FOR PRODUCING A FIBRE COMPOSITE COMPONENT

(75) Inventors: Ralf-Peter Dittmann, Rotenburg (DE); Sebastian Kaschel, Bremen (DE); Lothar Engler, Kirchlinteln (DE)

(73) Assignee: Airbus Operations GmbH, Hamburg (DE)

(*) Notice: Subject to any disclaimer, the term of this patent is extended or adjusted under 35 U.S.C. 154(b) by 38 days.

(21) Appl. No.: 13/108,203

(22) Filed: May 16, 2011

(65) Prior Publication Data
US 2011/0272086 A1    Nov. 10, 2011

Related U.S. Application Data

(63) Continuation of application No. PCT/EP2009/065442, filed on Nov. 19, 2009.

(60) Provisional application No. 61/118,266, filed on Nov. 26, 2008.

(30) Foreign Application Priority Data

Nov. 26, 2008    (DE) .......................... 10 2008 044 069

(51) Int. Cl.
| | |
|---|---|
| *B29C 33/48* | (2006.01) |
| *B29C 70/44* | (2006.01) |
| *B29C 73/04* | (2006.01) |
| *B29C 73/30* | (2006.01) |
| *B29C 33/56* | (2006.01) |

(52) U.S. Cl.
CPC .............. *B29C 33/485* (2013.01); *B29C 70/44* (2013.01); *B29C 73/04* (2013.01); *B29C 73/30* (2013.01); *B29C 33/56* (2013.01); *B29K 2911/12* (2013.01)

(58) Field of Classification Search
CPC ................................ B29C 70/33; B29C 33/56

USPC .......... 156/155, 242, 245, 169, 173, 175, 94, 156/98

See application file for complete search history.

(56) References Cited

U.S. PATENT DOCUMENTS

| | | | | |
|---|---|---|---|---|
| 2,760,896 A | * | 8/1956 | Nash ............................. | 156/184 |
| 2,993,526 A | * | 7/1961 | Young ........................... | 156/155 |

(Continued)

FOREIGN PATENT DOCUMENTS

| | | |
|---|---|---|
| CA | 2361761 A1 | 8/2000 |
| CN | 1334892 A | 2/2002 |

(Continued)

OTHER PUBLICATIONS

International Search Report for PCT Application No. PCT/EP2009/065442 dated Aug. 24, 2010.

(Continued)

*Primary Examiner* — Jeff Aftergut
(74) *Attorney, Agent, or Firm* — Jenkins, Wilson, Taylor & Hunt, P.A.

(57) ABSTRACT

A shaped body and a method for producing fiber composite components, wherein the shaped body is formed using a paper and/or cardboard material, at least in part. This makes possible cost-effective manufacture of hollow profiles of any desired length from fiber composite materials, in particular from prepreg materials and/or reinforcing fiber arrangements which are subsequently impregnated with a curable plastics material. The paper and/or cardboard material can be provided with further properties, such as gas-tightness and non-stick properties, by applying suitable functional layers. Moreover, the material makes it possible to produce highly dimensionally stable shaped bodies or support cores, in such a way that fiber composite components having highly reproducible spatial dimensions can be produced. In addition, after curing, the shaped bodies can be collapsed in a simple manner by applying a vacuum and thus removed from the fiber composite component without residues.

15 Claims, 3 Drawing Sheets

(56) References Cited

U.S. PATENT DOCUMENTS

| | | | |
|---|---|---|---|
| 3,506,515 A * | 4/1970 | Robinson et al. ............. 156/173 |
| 4,622,091 A * | 11/1986 | Letterman ............. B29B 15/105 |
| | | | 264/258 |
| 4,778,075 A * | 10/1988 | Wiegand et al. .............. 220/645 |
| 5,137,672 A * | 8/1992 | Fujiu et al. .................... 264/130 |
| 5,258,159 A * | 11/1993 | Freeman ............... B29C 70/086 |
| | | | 264/258 |
| 5,935,704 A * | 8/1999 | Happy .......................... 428/361 |
| 2005/0230552 A1* | 10/2005 | Engwall ............... B29C 33/485 |
| | | | 244/133 |
| 2007/0196635 A1 | 8/2007 | Krogager et al. |

FOREIGN PATENT DOCUMENTS

| DE | 1 436 940 A | 5/1970 |
|---|---|---|
| DE | 295 19 767 U1 | 2/1996 |
| DE | 100 46 704 A1 | 4/2002 |
| EP | 134069 A1 | 9/2001 |
| EP | 1688238 A1 * | 8/2006 |
| EP | 1800825 A1 | 6/2007 |
| FR | 2707916 A1 * | 1/1995 |
| GB | 1358273 A * | 7/1974 |
| GB | 1422828 A | 1/1976 |
| WO | WO-99/11849 A1 | 3/1999 |
| WO | WO-2007/129094 A2 * | 11/2007 |
| WO | WO-2007/129096 A2 * | 11/2007 |
| WO | WO-2007129094 A2 * | 11/2007 |

OTHER PUBLICATIONS

German Office Action for German Application No. DE 10 2008 044 069.8-24 dated Sep. 7, 2009.

Chinese Office Action (with English translation) for Application No. 200980147138.1 dated Apr. 1, 2013.

* cited by examiner

MOULDED BODY FOR PRODUCING A FIBRE COMPOSITE COMPONENT

CROSS-REFERENCE TO RELATED APPLICATIONS

This application is a continuation of and claims priority to PCT International Application No. PCT/EP2009/065442 filed Nov. 19, 2009, which claims the benefit of U.S. Provisional Application No. 61/118,266, filed Nov. 26, 2008 and German Patent Application No. 10 2008 044 069.8, filed Nov. 26, 2008, the entire disclosures of which are herein incorporated by reference.

FIELD OF THE INVENTION

The invention relates to a shaped body for producing a fibre composite component. The invention further relates to a method for producing a fibre composite component formed using a thermosetting plastics material, using at least one shaped body according to the invention.

In modern aircraft construction, in plant engineering, in alternative energy systems and in sports equipment, fibre composite components are increasingly being used for producing structural components. For example, shell segments for forming fuselage sections in the known four-shell construction are produced using carbon-fibre-reinforced epoxy resins or other fibre-reinforced thermosetting plastics materials. Furthermore, rudder units, horizontal tail planes, aerofoils, wing boxes, Samer rods and further structural and non-structural aircraft components can be formed using fibre composite materials of this type.

Shell segments comprise inter alia a skin panel which is formed using a fibre composite material and onto which further structural components for reinforcement, such as stringer profiles or former segments, can be fastened internally, in particular by adhesion. The stringer profiles mentioned by way of example are hollow profiles, which extend in the longitudinal direction of the relevant fuselage section and are preferably arranged internally distributed around the periphery of the fuselage section. To reinforce an aircraft fuselage cell of a medium-sized aircraft type, up to 4 km of hollow profiles each having a length of up to 20 m are required. These hollow profiles are preferably what are known as Ω stringers, having an approximately trapezium-shaped cross-section.

For the integral formation of stringer hollow profiles on a skin panel, shaped bodies, for example, are position on the points desired to be static of a skin panel, which is formed using a prepreg material and/or using a fibre composite material, the skin panel being laid on a base having a correspondingly configured surface shape. The shaped body and the regions of the skin panel attached thereto are subsequently surfaced with a prepreg material in layers, or prefabricated strip profiles are laid on the shaped body. Once sealing tapes and optional functional layers (drainage layer, tear-off fabric, membranes, distributor media, separating foil, etc.) have been laid and a vacuum foil has been applied, the entire construction is evacuated and introduced into an autoclave to cure the stringer profiles.

Preformed film hoses, which are placed under pressure before the prepreg material is applied, and/or rigid foam profiles may for example be used as shaped or supporting bodies for the Ω stringers which are to be produced.

The rigid profiles have in particular the drawback that they are difficult or impossible to remove from the finished fibre composite component, and represent a static, unnecessary extra weight after the curing process. Because of the porosity thereof, they also make the obligatory ultrasonic material testing more difficult, since the pores have an uncontrolled effect on the back wall echo. Moreover, the open-pore rigid foam profiles may cause problems as regards penetrating condensation water.

However, the preformed pressure hoses further only have a low dimensional stability, and this can lead to defects, for example in the form of local delaminations or fibre angle deviations, in the layer construction of the Ω stringer hollow profile or in the skin laminate. Furthermore, perforations often cause problems as regards the requirement for the hose profile to be gastight. Moreover, pulling out the pressure hoses is problematic even when they are evacuated, since they adhere to the inside of the stringer hollow profile in an uncontrolled manner, in such a way that the pressure hoses often tear because of the low tear-resistance thereof and thus leave behind undesired film residues.

In addition, there are core materials which can be removed from undercut fibre composite components substantially without residues by using a solvent, such as water. However, these core materials are extremely expensive, and also only have a limited dimensional accuracy because of the water-solubility thereof and the accordingly limited tendency thereof to absorb water, in such a way that it is virtually impossible to manufacture low-tolerance fibre composite components.

SUMMARY OF THE INVENTION

The object of the invention is therefore to provide a shaped body for producing fibre composite components which largely overcomes the drawbacks described above of support cores for producing composite components.

This object is achieved by constructing a support core in the form of a shaped body by using cardboards, and papers. The support core can be collapsed and removed from a finished fibre composite component. Because the shaped body is formed using cardboard and/or paper, at least in part, it is possible to produce shaped bodies extremely cost-effectively with a wide range of three-dimensional configurations and virtually any desired lengths. In addition, the shaped body configured in accordance with the invention can significantly simplify the production of fibre composite components of all types, such as elbows, plates or hollow profiles. The paper and/or cardboard used may be of virtually any desired material thickness. Cardboards having a preferably regularly repeating geometric hollow construction, such as corrugated boards or sandwich boards, can also be used. The shaped body formed using cardboard and/or paper has a high dimensional stability, in such a way that the fibre composite components to be manufactured can be produced with a high dimensional accuracy. Furthermore, the use of these materials makes environmentally sound disposal possible. The use of paper and/or cardboard materials to produce support cores further makes it possible to use the whole range of production methods known from the packaging industry, such as cutting, scoring, perforating, folding, creasing, gluing, compression and compaction, to produce shaped bodies or support bodies having virtually any desired complex surface geometry, and in addition, continuous production of shaped bodies having virtually any desired lengths is possible starting from paper and/or paperboard material stored on supply rolls. Moreover, if necessary a plurality of shaped bodies can be joined without adhesives by using positive connections. Cardboards and/or papers having sufficient thermal stability are preferably used.

As semi-finished products, i.e. at the point of manufacture, the cardboards and/or papers can be prepared in such a way as to be non-stick, for example.

An advantageous development provides that the shaped body is a support core, in particular for producing a hollow profile. This results for example in a considerable cost reduction when constructing what are known as Ω stringer hollow profiles on fuselage sections, which are formed using fibre composite materials and which are required in large numbers in fuselage section manufacture or aircraft fuselage cell manufacture.

Moreover, the shaped body according to the invention can advantageously be applied in many further technical fields, such as shipbuilding, wind energy, boiler construction, the production of leisure equipment, and mechanical engineering in general.

A further advantageous embodiment of the shaped body provides that it has a cross-section which can in particular be formed from any desired combination of a triangular, rectangular, trapezium-shaped, annular, oval or elliptical cross-section.

As a result, reinforcement profiles made of fibre composite materials can be manufactured in a wide range of variations using the shaped body configured according to the invention. For example, by using a support core having a circular geometry, pipes or Samer rods can be produced in a simple manner using fibre composite materials. However, support cores having an approximately trapezium-shaped cross-section are used in the manufacture of what are known as Ω stringer hollow profiles, which are required in large numbers for reinforcing fuselage cell structures. Irrespective of this, support cores having a substantially rectangular cross-section may for example be used as pressure plates in a prepreg construction, for preventing laminate warpage in the subsequent curing process in an autoclave.

In a further advantageous embodiment of the shaped body, it is formed using at least two partial support cores. This embodiment makes it possible to form more complex geometric shapes using a combination of simple base shapes.

A further development of the shaped body provides that the partial support cores are joined together, in particular adhesively at least in regions and/or positively connected to one another. This provides firm cohesion and thus high dimensional stability in a support core formed from a plurality of partial support cores.

A further development of the shaped body provides that the shaped body comprises a functional layer, in particular a non-stick layer and/or a sealing layer, at least in regions. In particular, this functional layer can make the shaped body gastight. Moreover, the functional layer makes it easier to remove the shaped body from the produced fibre composite component. These functional layers are preferably already applied to or integrated into the paper and/or cardboard, as semi-finished products for the shaped bodies, at the point of manufacture.

In a further development, the shaped body can be removed from the fibre composite component by vacuum and/or by using a solvent. A vacuum may for example be applied to the shaped body by introducing a suction plug into an end region of the shaped body, whilst a remote side of the shaped body is sealed in a pressure-tight manner by a sealing plug. Alternatively, the support core may already be provided with at least one socket for a suction or pressure hose at the point of manufacture. The suction plug and the sealing plug each have a three-dimensional shape which makes firm and above all pressure-tight mounting possible in the shaped body. To achieve this, the plugs may be provided with resilient sealing means, such as peripheral sealing edges, sealing profiles, sealing lips or the like. Furthermore, the plugs may be manufactured using a resilient foamed plastics material, such as a polyethylene foam, which is additionally tapered slightly on all sides.

A vacuum pump is attached to the suction plug using a hose line. After the fibre composite component to be produced has been cured, the vacuum pump can be used to generate a vacuum in the shaped body, and this vacuum causes the shaped body or support core in the finished fibre composite component to collapse under the effect of the ambient air pressure. Once the support core has collapsed it can be removed from the fibre composite component in a simple manner.

Alternatively, the shaped body can also be softened using a suitable solvent, such as water in a liquid and/or gaseous state, and optionally also removed from the fibre composite component without residues by rinsing.

A further advantageous embodiment of the shaped body provides that the shaped body can be subsequently introduced into a previously cured fibre composite component and can be applied positively to the fibre composite component at least in regions using an overpressure, for example to make it possible to carry out repair work on damaged CFRP components.

A support core which is initially still collapsed may for example be introduced or inserted in the region of a defect in a component, such as a tear. Subsequently, the support core is placed under pressure or "inflated" using a compressor, and this ideally results in the support core being applied to the internal surface of the fibre composite component over the entire surface and a repair being made possible by the external, layered application of prepreg material. The compressor is also attached to the support core via a hose, which is attached to a pressure plug, it also being possible for the pressure plug to be connected to or inserted into the support core in a pressure-tight manner. Alternatively, the repair support core may also be provided with at least one socket, provided at the point of manufacture, for a pressure and/or vacuum hose. Furthermore, the shaped bodies can be used as plate-shaped thrust members and shaped cores for sandwich components.

The object of the invention is also achieved by a method to produce fiber composite component that is defined by the shaped body described hereinbefore.

An advantageous development of the method provides that at least one shaped body is provided with a curable fibre composite material, in particular with a prepreg material, at least in regions, the fibre composite material is subsequently cured and the at least one shaped body is removed from the finished fibre composite component.

In a primary application of the method, in the form of producing an skin panel reinforced by Ω stringers, which parts together form a fibre composite component, the method proceeds for example as follows:

In a first method step, a skin panel, which in this method alternative is likewise formed using a prepreg material, is initially spread on a working base. Subsequently, at least one shaped body, formed according to the invention using cardboard and/or using paper, is positioned on the skin panel as a support core and coated in layers with a curable fibre composite material, in particular with the prepreg material used for the skin panel.

Subsequently, the fibre composite material is cured in a second method step, and this takes place for example at room temperature, in an oven or in an autoclave in an overpressure. In some cases, further method steps such as constructing a gastight vacuum construction are necessary for the autoclave curing process. The vacuum construction further comprises further functional layers, such as tear-off fabric, separating foils and distributor media. Instead of sealing tapes, sealing compounds or sealing putty, sealing beads, adhesive tapes or O-seals may be used. It is generally necessary to seal the vacuum foil from the working base to free the prepreg material from porosities, material separations and the like by applying a vacuum, and to achieve an ideally completely homogeneous laminate construction. The shaped bodies are removed from the cured fibre composite component in a third method step. This removal may for example be carried out by applying a vacuum to the shaped bodies, in such a way that they collapse or fall in on themselves under the effect of the ambient air pressure, and can be pulled out from the fibre composite component in a simple manner. The collapse of the shaped body or support core means that any undercuts conflicting with the shaped body are resolved. Alternatively, it is possible to soften the shaped body using a suitable solvent, such as water, and if necessary to rinse it out of the composite component in a residue-free manner by supplying further solvents.

The above-mentioned method variant using the shaped body according to the invention can be applied when producing fibre composite components which are formed by joining together at least two components formed using a fibre composite material, such as a skin panel and a plurality of Ω stringer hollow profiles. In this context, the term "fibre composite material" means a fibre composite material which has not yet been cured at the time of processing, for example a carbon-fibre-reinforced epoxy resin, prepreg and/or dry fibre semi-finished product for matrix infusion.

Alternatively, the method can also be used for joining together at least one cured fibre composite material, such as a skin shell, and components which are to be fixed thereto and have not yet been cured, such as stringer profiles, former segments or support elbows. Conversely, cured stringer profiles may also be applied to a soft skin panel, i.e. one constructed using prepreg material.

Further, the method can also be carried out for manufacturing components by impregnation or resin infusion of initially dry reinforcing fibre arrangements. Examples of manufacturing methods starting from dry reinforcing fibre arrangements include "resin film infusion", "vacuum infusion", and "resin transfer moulding" or RTM, for example.

Further advantageous embodiments of the method are specified in the further claims.

DESCRIPTION OF EXEMPLARY EMBODIMENTS

Figure 1:
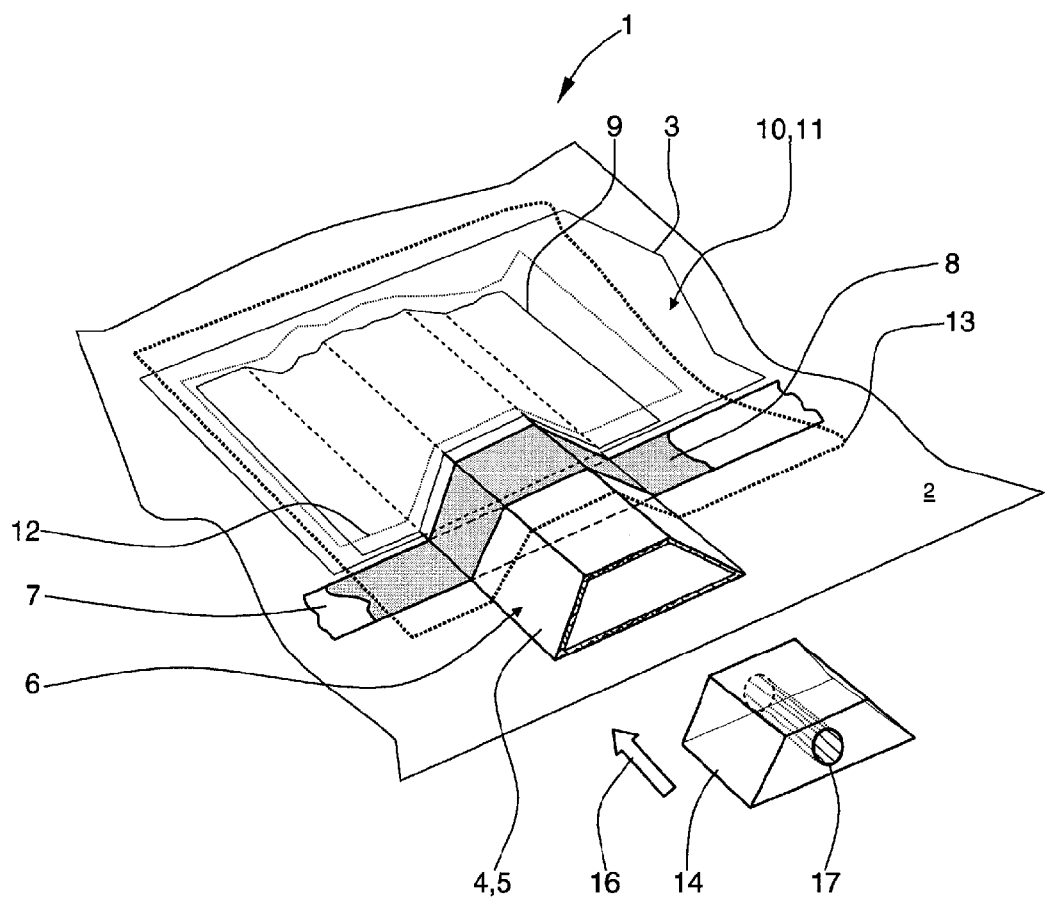
FIG. 1 is a perspective view of an exemplary construction for producing a fibre composite component using the shaped body according to the invention.
Figure 2:
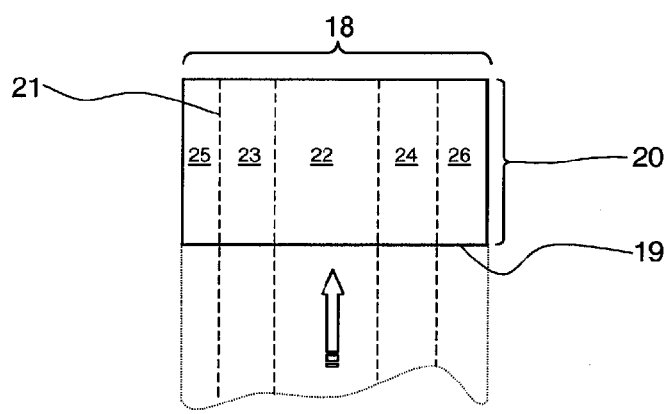
FIG. 2-6 show the production of a typical shaped body from a planar cardboard and/or paper blank.

In the drawings, like constructional elements have like reference numerals in each case.

FIG. 1 is a schematic drawing of a construction which can be used to produce a fibre composite component using a shaped body configured according to the invention.

A construction 1 which is intended to be cured in an autoclave comprises inter alia a base 2, on which a planar, web-shaped prepreg material 3 is spread to produce a skin panel. The prepreg material 3 may comprise a plurality of layers stacked on top of one another to achieve a material thickness of up to 70 mm. The base 2 has a surface geometry of a configuration which corresponds to the fibre composite component to be manufactured and which is generally curved in at least one dimension of space. A shaped body 5, in this case formed as a hollow support core 4, is located on the prepreg material 3. The support core 4 has a trapezium-shaped cross-section. According to the invention, the support core 4 or the shaped body 5 is formed from a corrugated cardboard material using a blank produced from an initially planar blank by folding. Two preferably self-adhesive sealing tapes 7, 8 extend between an end portion 6 of the support core 4 and the prepreg material 3 and on the support core 4 itself to produce a gastight edge seal. The sealing tapes 7, 8 are self-adhesive on one or both sides. A prepreg material 9 is laid on the upper face of the support core 4, and in the embodiment of FIG. 1 is used to form what is known as an Ω stringer profile on the substantially planar prepreg material 3. When subsequently cured, the cured prepreg materials 3 and 9 form, in combination with further superstructures (not shown) made of prepreg material and/or dry reinforcing fibre arrangements, a fibre composite component 10, which in the drawing is part of a larger shell segment 11 for forming a fuselage section in a multi-shell construction. If necessary, one or more functional layers 12, such as non-stick layers, separating foils or the like, may be arranged above and/or below the prepreg materials 3, 9. The prepreg material 9, including the functional layers 12 which are if necessary arranged thereon, is finally covered on top with a vacuum foil 13. The construction 1, comprising the base 2, the support core 4, optionally one or more functional layers 12, and the vacuum foil 13, encloses the component to be manufactured in the form of the shell segment 11 on all sides. The entire construction 1 is sealed at the edges in a gastight manner using the sealing tapes 7, 8, which are preferably what are known as "putty tapes". Furthermore, additional sealing measures, for example resilient sealing compounds, sealing cords or sealing putty, are generally necessary in addition to the two sealing tapes 7, 8 to achieve a sufficient gastight closure of the fibre composite materials 3, 9. Moreover, the construction 1 can if necessary have feed lines (not shown) for liquid resin or sockets for evacuation using a vacuum pump.

For curing, the entire construction 1 is for example introduced into an autoclave (not shown), the space defined by the vacuum foil 13 and the base 2 being evacuated as much as possible so as inter alia to prevent inclusions of air and to achieve a homogeneous laminate construction without warpages.

During the curing process in the autoclave, the same pressure of for example up to 10 bar prevails in each case outside the vacuum foil 13 and in the interior 15 of the support core 4, in such a way that the support core 4 is not exposed to increased pressure forces which might lead to undefined shape deviations and consequently to uncontrollable and in particular non-reproducible dimensional deviations in the subsequent fibre composite component 10.

After the curing process in the autoclave is complete, a suction plug 14 is introduced into an interior 15 of the end portion 6 of the support core 4 in the direction of the arrow 16. The suction plug 14 is adapted as precisely as possible to the respective geometry of the support core 4 in the end portion 6, in such a way that a pressure-tight connection to the support core 4 is possible. The suction plug 14 may for example be produced using a closed-cell foamed material which is configured slightly conically. Silicone rubber is also suitable as a material for the plugs because of the favourable non-stick properties thereof in conjunction with a high resilience.

Via a preferably pluggable socket 17, the support core 4 can be collapsed under the effect of the ambient air pressure by applying a vacuum, i.e. the support core falls in on itself and can be pulled out from the fibre composite component 10 without residues with little mechanical resistance, in particular even in the case of large lengths of the support core 4. The vacuum is generated for example using a vacuum pump (not shown) which is connected to the suction plug 14 via a hose line, the hose line being connected to the suction plug by means of the (plug) socket 17. To make it possible to evacuate the support core 4, a socket-free sealing plug is introduced in the region of a rear second end portion (not shown) of the support core 4 so as to seal the interior 15 hermetically tightly from the surrounding atmosphere. Alternatively, this second end portion of the support core 4 can also simply be compressed and optionally glued so as to provide a hermetically tight closure. Furthermore, any further openings which are still present in the support core 4 have to be sealed.

By contrast with the previously described function as a means for introducing a vacuum into the interior 15 of the support core 4, the suction plug 14 may also function as a pressure plug. This configuration can be applied in particular if for example a defective Ω stringer profile in a fuselage cell structure, for example an Ω stringer profile having a tear, subsequently needs to be repaired. In a configuration of this type, the support core 4 is initially introduced into the Ω stringer profile in the region of the defect, and subsequently inflated by means of the pressure plug in such a way that the support core 4 ideally lies completely against the interior 15 of the Ω stringer profile (temporarily stable laminated core). The support core 4 may for example be inflated using a compressor which is likewise connected to the (plug) socket 17 of the pressure plug via a hose line. Subsequently, the defect can be repaired in a known manner by overlaminating prepreg material. Once the repair is completed and the prepreg material has been cured, the pressure plug is again used in the original function thereof as a suction plug 14, in such a way that the support core 4 can be collapsed by applying a vacuum and can be removed from the Ω stringer profile.

Alternatively, dry fibre semi-finished products can be used instead of the prepreg materials 3, 9, in which case a different vacuum construction may be required for the resin infusion.

Furthermore, the method using the shaped body 5 or support core 4 can also be applied to fuselage sections which are to be produced in one piece by winding, as well as to the production of fibre composite components for producing fuselage sections in a multi-shell construction.

FIGS. 2 to 6, which are also referred to later in the description, illustrate schematically how the support core 4 is produced from a planar corrugated cardboard blank or paper blank.

Starting from a web-shaped continuous blank 18, a blank 20 of the required length is separated along a cutting line 19. A plurality of fold lines, of which one fold line 21 is provided with a reference numeral, are made in this blank 20, which is initially still planar, to make geometrically defined folding possible. Alternatively, the web-shaped continuous blank 18 used may already comprise the required fold lines 21. In further method steps, the support core 4 is folded from the blank 20 along these fold lines, shown as dashed lines in each case. If the continuous portion 18 is formed using a corrugated cardboard material, the fold lines 21 preferably each extend perpendicular to the crest line or base line so as to achieve the greatest possible rigidity of the shaped body. This aspect is irrelevant if a compact cardboard or paper material is used. The fold lines 21 divide the blank 20 into a base face 22 and side faces 23 and 24 adjacent thereto on either side. The joining faces 25 and 26 are adjacent to the two side faces 23, 24 respectively.

Figure 3:
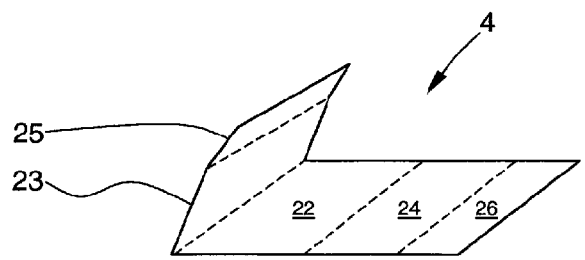
Figure 4:
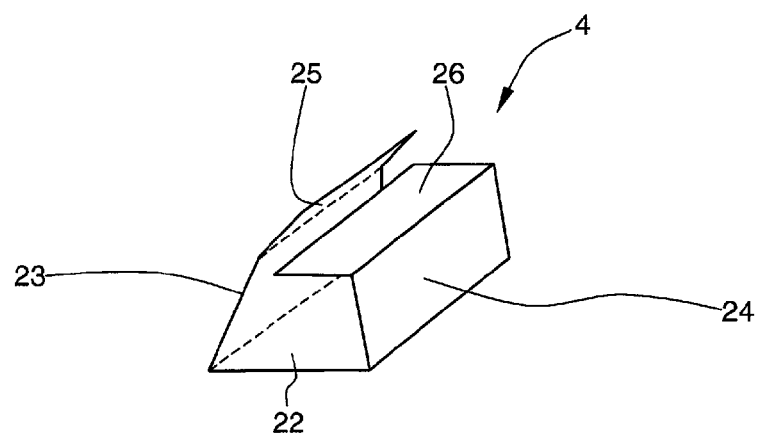
Figure 5:
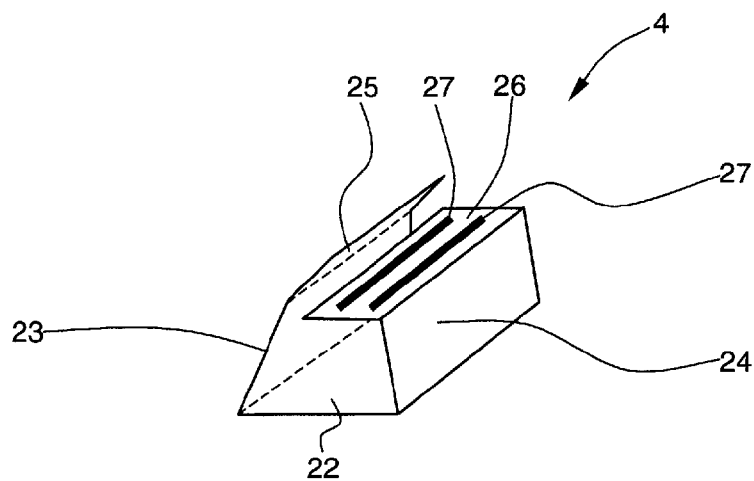
Figure 6:
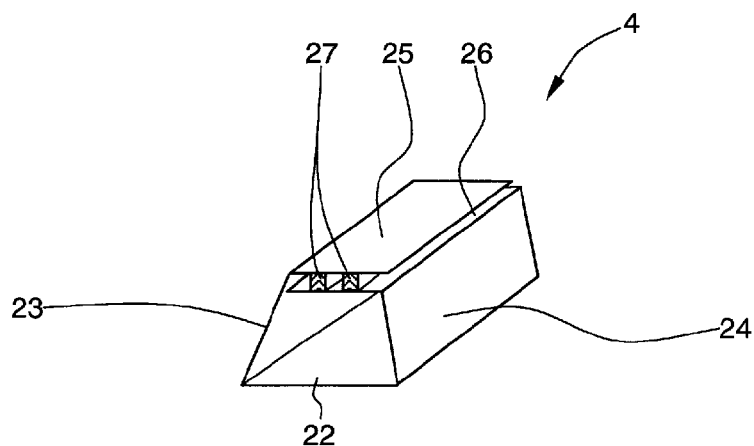

In FIG. 3, the left-hand side face 23 of the support core 4 is initially folded upwards along with the joining face 25 adjacent thereto. Subsequently, as is shown in FIG. 4, the right-hand side face 24 is folded in the opposite direction along with a second joining face 26 adjacent thereto. Subsequently, adhesive 27 is applied to the second joining face 26 at least in regions in the form of adhesive beads, and, as is shown in FIG. 6, the first joining face 25 is folded down so as to be glued to the second joining face 26 to complete the support core 4. Instead of gluing, the joining faces 25, 26 may for example also be connected by positive locking. If corrugated cardboard is used, the support core 4 can only be made gas-tight, as is generally desired, by an additional sealing measure, such as sealing and/or adhesive tapes, as otherwise gas or the ambient air can flow through the hollow spaces in the corrugations and/or between the adhesive beads.

This production of the support core 4 should merely be thought of as one example out of a number of conceivable manufacturing options, since the whole range of process steps available from the packaging industry can be used to produce the support core 4.

Figure 7:
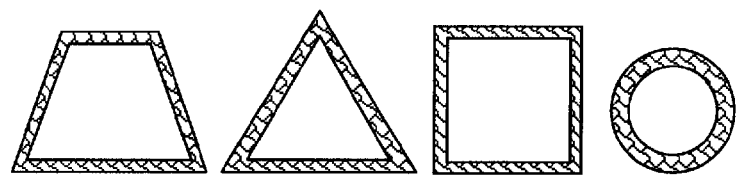
FIG. 7-8 show an exemplary combination of shaped bodies for different applications having different cross-sections.
Figure 8:
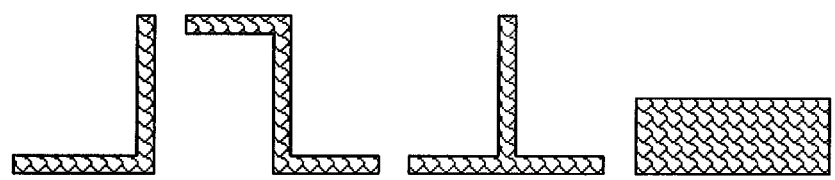

FIGS. 7 and 8 illustrate a selection of shaped bodies each having different cross-sections.

FIG. 7 outlines four (hollow) shaped bodies each having a different cross-section.

Unlike the shaped bodies of FIG. 7, the shaped bodies of FIG. 8 are solid, i.e. formed without hollow spaces. The shaped bodies outlined in FIG. 7 are used above all for producing hollow profiles having a corresponding cross-section using a prepreg material and/or using dry reinforcing fibre arrangements which are yet to be impregnated with a suitable plastics material. By contrast, the shaped bodies of FIG. 8 may be provided in particular as a universal manufacturing aid (shaping and/or support means) in the production not of hollow-profile-type fibre composite components, but of any profile-type elongate elements such as T stringers, U stringers, I stringers, Z stringers or L stringers.

All of the shaped bodies shown in FIGS. 7 and 8 can be produced either using a conventional corrugated cardboard material or using a solid paper and/or cardboard material of a relatively high material thickness. Moreover, the shaped bodies may also be formed using pasteboard articles which have a preferably regularly repeating hollow space structure in the manner of a cardboard sandwich element. The shaped body shown on the far right in FIG. 8 having a rectangular cross-section is preferably used as a pressure plate in the production of fibre composite components from prepreg materials in an autoclave, in particular so as to prevent warpages in the laminate construction.

LIST OF REFERENCE NUMERALS 1 construction
2 base
3 prepreg material (for example for skin panel)
4 support core
5 shaped body
6 end portion (support core)
7 sealing tape (lower)
8 sealing tape (upper)
9 prepreg material (for example for Ω stringer profile)

-continued

LIST OF REFERENCE NUMERALS 10 fibre composite component
11 shell segment
12 functional layers
13 vacuum foil
14 suction plug/pressure plug
15 interior (support core)
16 arrow
17 socket
18 continuous blank
19 cutting line
20 blank
21 fold line
22 base face ⎫
23 left-hand side face ⎪
24 right-hand side face ⎬ support core
25 first joining face ⎪
26 second joining face ⎭
27 adhesive

The invention claimed is:

1. A method for producing a fibre composite component by using a thermosetting plastics material, comprising:
    forming at least one support core using at least one of cardboard and a paper, defining a geometry of the fibre composite component by the at least one support core, at least in regions,
    wherein the support core, at least in regions of said support core, comprises a functional layer integrated in said support core, wherein said functional layer is a non-stick layer and a gastight sealing layer,
    providing the at least one support core with a curable fibre composite material,
    curing the curable fibre composite material to form a finished fibre composite component, wherein due to a gastight sealing of the support core in conjunction with a sealing surrounding the fibre composite component to be cured provides a gastight enclosure of the fibre composite component, and applying a pressure differential between the curable fibre composite component and the surrounding atmosphere during the cure process, and
    collapsing and removing the at least one support core from the finished fibre composite component.

2. The method according to claim 1, wherein at least one support core is provided with a curable fibre composite material comprising a prepreg material.

3. The method according to claim 1, wherein at least one support core is provided with a dry reinforcing fibre arrangement, at least in regions, followed by:
    impregnating the dry reinforcing fibre arrangement with a thermosetting plastic material to produce a curable fibre composite material,
    curing the curable fibre composite material, and
    removing the at least one support core from the finished fibre composite component.

4. The method according to claim 3, wherein the at least one support core having the applied fibre composite material is further covered with a vacuum foil, at least in regions, to produce a construction.

5. The method according to claim 4, wherein the edges of the construction are sealed in a gas tight manner from the vacuum foil using sealing tapes to achieve a gastight closure.

6. The method according to claim 4, wherein the construction is cured by introducing it into at least one of an autoclave, an oven, at room temperature and at normal pressure.

7. The method according to claim 1, wherein the at least one support core is collapsed after curing by applying a vacuum to the at least one support core.

8. The method according to claim 1, wherein the at least one support core is removed from the fibre composite component using at least one of a liquid and gaseous solvent.

9. A support core for producing a fibre composite component, comprising:
    a plurality of contact surfaces situated at least in certain regions of the support core, wherein said plurality of contact surfaces are provided for shaping a component to be cured being formed by a curable fibre composite material, and at least in regions of said support core a functional layer integrated in said support core, wherein said functional layer is a non-stick layer and a gastight sealing layer,
    wherein the support core is formed using at least one of a cardboard and a paper, and
    wherein the support core can be collapsed due to a shape change by deformation of the at least one cardboard and paper and removed from a finished fibre composite component, and
    wherein the gastight sealing layer provides a gastight sealing of the supporting core, wherein the gastight sealing in conjunction with a sealing surrounding the fibre composite component to be cured provides a gastight enclosure of the fibre composite component to be cured on the plurality of contact surfaces of the support core capable of applying a pressure differential between the curable fibre composite component and the surrounding atmosphere during the curing process.

10. The support core according to claim 9, wherein the support core is used to produce a hollow profile.

11. The support core according to claim 9, wherein the support core has a cross-section formed from at least one of a triangular, rectangular, trapezium, annular, oval and elliptical shape.

12. The support core according to claim 9, wherein the support core is formed using at least two partial support cores.

13. The support core according to claim 12, wherein the partial support cores are joined together, by at least one of an adhesively and positive connection method.

14. The support core according to claim 9, wherein the support core is removable from the fibre composite component by using at least one of a vacuum and a solvent.

15. The support core according to claim 9, wherein the support core is capable of being applied positively into a cured fibre composite component at least in regions using an overpressure, making it possible to carry out field repair work on the cured fibre composite component.

* * * * *